United States Patent [19]

Kohl et al.

[11] Patent Number: 4,668,586

[45] Date of Patent: May 26, 1987

[54] MAGNETIC RECORDING MEDIA

[75] Inventors: Albert Kohl, Laumersheim; Milena Melzer, Ludwigshafen; August Lehner, Roedersheim-Gronau; Norbert Schneider, Altrip; Eberhard Koester, Frankenthal; Werner Balz, Limburgerhof; Friedrich Sommermann, Kehl; Ernst Ricker, Willstaett, all of Fed. Rep. of Germany

[73] Assignee: BASF Aktiengesellschaft, Fed. Rep. of Germany

[21] Appl. No.: 787,088

[22] Filed: Oct. 15, 1985

[30] Foreign Application Priority Data

Oct. 18, 1984 [DE] Fed. Rep. of Germany ....... 3438092

[51] Int. Cl.$^4$ ............................................. G11B 5/71
[52] U.S. Cl. .............................. 428/411.1; 252/62.54; 427/128; 428/522; 428/694; 428/695; 428/900

[58] Field of Search .............. 428/694, 900, 695, 522, 428/411.1; 427/131, 128; 252/62.54; 360/134–136

[56] References Cited

U.S. PATENT DOCUMENTS

| 3,029,157 | 4/1962 | Sutheim et al. | 428/900 |
| 3,072,577 | 1/1963 | Miller | 252/62.54 |
| 3,144,352 | 8/1964 | Talley et al. | 428/900 |
| 3,274,111 | 9/1966 | Sada et al. | 428/425.9 |
| 3,492,235 | 1/1970 | Matsumoto et al. | 252/62.54 |
| 4,171,399 | 10/1979 | Allen | 428/695 |

FOREIGN PATENT DOCUMENTS 1416618  3/1975  United Kingdom .

Primary Examiner—Ellis P. Robinson

[57] ABSTRACT

In magnetic recording media consisting of a non-magnetic base and, bonded on top of this, one or more magnetizable layers based on magnetic material finely dispersed in a polymer binder, a lubricant and further conventional additives, the lubricant used is a triethanolamine esterified with oleic acid.

2 Claims, No Drawings

MAGNETIC RECORDING MEDIA

The present invention relates to magnetic recording media which consist of a non-magnetic base and, bonded on top of this, one or more magnetizable layers based on magnetic material finely dispersed in a polymer binder, a lubricant and further conventional additives, and which possess lower coefficients of friction, improved abrasion behavior of the magnetic layer under conditions of high humidity, and high stability of the signal level.

During the recording and playback of signals by means of magnetic recording media which are passed over the magnetic head and in contact with the latter and are furthermore conveyed over direction-changing rollers or pins or other guide elements, very high frictional forces and, frequently, also the stick-slip effect may occur, depending on the form of the layer. Moreover, the abrasion which occurs when such recording media are used presents a problem with regard not only to the service life but also in respect of reliability of operation. It is therefore usual to add lubricants to the layer compositions of magnetic recording media. Examples of suitable lubricants are polydimethylsiloxanes, liquid paraffins, waxes, saturated and unsaturated fatty acids, fatty acid esters, fatty acid amides, salts of fatty acids and solid lubricants, such as molybdenum sulfide, graphite, polytetraethylene powder and polytrichlorofluoroethylene powder. It has also been stated that, compared with the solid lubricants, liquid or pasty lubricants have the advantage that they cover the surfaces being lubricated with a thin homogeneous surface film; the amount of lubricant added must be kept very small since otherwise the surface readily becomes tacky. However, these lubricants frequently cannot be used as the sole lubricant and are therefore combined with solid or pasty lubricants. In many fields of use, particularly in the case of a prolonged period of wetting and under unfavorable conditions of temperature and humidity, neither sticking nor blocking and adhesion of the tapes can be permanently avoided by using the abovementioned lubricants. It is also impossible to prevent the tapes from exhibiting marked signs of abrasion after only a short time, so that the playback quality deteriorates noticeably, particularly under extreme conditions.

In addition to the stated lubricants, those obtained from animal and vegetable hydrocarbons have also been proposed. U.S. Pat. No. 3,144,352 describes the use of paraffin waxes, and U.S. Pat. No. 3,029,157 describes the use of animal and vegetable fats as lubricants in magnetic recording media. Furthermore, U.S. Pat. No. 3,492,235 discloses the use of mixtures of hydrocarbons and esters as lubricants in magnetic recording media. The addition of esters of fatty acids and monoalcohols as lubricants to magnetic recording media, in particular video tapes, is disclosed in U.S. Pat. No. 3,274,111. However, difficulties related to the exudation of the lubricant frequently occur in this case. This exudation phenomenon is due to the fact that many commercial esters, or fatty acids used for the preparation of these esters, are mixtures of different homologs which are difficult to separate from one another, some of these homologs being liquid at the temperature prevailing during use and others being solid at this temperature.

German Published Application DAS No. 2,250,382 describes a lubricant combination comprising amines and arylsulfonic acids, in particular the combination of triethanolamine dioleate with dodecylbenzenesulfonic acid. Plasticizers which are also known lubricants are also added. However, the Examples show that the effect is achieved only with the claimed combination, the required properties not being obtained when the individual components of the combination are used, as shown by comparative experiments. Although the magnetic recording media prepared as described in German Published Application DAS No. 2,250,382 possess improved frictional properties and run more smoothly, they have a tendency to smear, particularly under unfavorable conditions of temperature and humidity, deposits are formed on the tape guide elements and the corrosion is substantially increased. However, particular difficulties are encountered when the abovementioned lubricant combination is used in conjunction with aqueous binder systems, since this lubricant combination, like most of the lubricants, cannot be incorporated uniformly.

The abovementioned hydrophobic lubricants are poorly absorbed by the magnetic material, particularly in an aqueous medium but also in organic solvents, and, in the large amount required, are readily exuded during continuous operation, particularly under unfavorable conditions, eg. high temperature and high humidity. This results in deposits on all parts in contact with the tape, particularly on the head, giving rise to drops in the output level.

It is an object of the present invention to provide magnetic recording media which contain a lubricant in the magnetic layer, the lubricant being highly effective even in small amounts so that on the one hand it does not make the magnetic layer too thermoplastic and on the other hand drops in output level as a result of exudation are avoided. Moreover, the lubricant should not produce any deposits, particularly under humid conditions, and corrosion should be avoided; the lubricant should furthermore be capable of being incorporated into binder systems which contain organic solvents as well as those in which the solvent is water.

We have found that this object is achieved and that, surprisingly, magnetic recording media which consist of a non-magnetic base and, applied on this, one or more magnetizable layers based on magnetic material finely dispersed in a polymer binder, a lubricant and further conventional additives possess the required properties if a triethanolamine esterified with oleic acid is used, as the sole lubricant, in an amount of from 0.1 to 2.0% by weight, based on the amount of magnetic material.

The lubricant present in the novel magnetic recording medium consists of triethanolamine in which one, two or three hydroxyl groups have been esterified with oleic acid.

For the purposes of the present invention, it has proven particularly advantageous if, in addition to the triethanolamine esterified with oleic acid and acting as the lubricant, a polymer consisting of a polyether-acrylate and (meth)acrylic acid is used as a dispersant to ensure that the magnetic material is homogeneously dispersed in the organic binder. The polymer used as a dispersant is prepared from 25–85% of a polyether-acrylate possessing from 2 to 10 ether groups per double bond and from 15 to 75% of acrylic acid or methacrylic acid. The dispersant may be dissolved in water or an organic solvent and be in the form of the free acid or in neutralized form.

The lubricant is added in an amount of from 0.1 to 2.0, preferably from 0.2 to 0.6, percent by weight, based on the amount of magnetic material, at as early a stage as the beginning of dispersing, which is carried out in a conventional apparatus, together with the other additives and with an amount of organic solvent or water sufficient to establish an advantageous viscosity. However, it is also possible to stir in the lubricant directly before casting the ready-prepared magnetic dispersion. The mixing time is then advantageously from 10 minutes to 5 hours, depending on the intensity of the stirrer used. Admixing the lubricant directly before the coating procedure was found to have no adverse effect.

Preferably used magnetic materials are finely divided acicular gamma-iron(III) oxide having a mean particle size of from 0.2 to 2 μm, in particular from 0.1 to 0.9 μm, or acicular chromium dioxide having the same particle structure as that stated for iron oxide. Other suitable magnetic materials are gamma-iron(III) oxide doped with heavy metals, in particular with cobalt, and finely divided metal alloys of iron, cobalt and/or nickel.

Suitable binders for the dispersion of the finely divided magnetic material are those conventionally used for the peparation of magnetic layers, such as a nylon copolymer which is soluble in conventional solvents, a polyvinyl formal, a polyurethane elastomer, mixtures of polyisocyanates and fairly high molecular polyhydroxy compounds, and vinyl chloride polymers containing more than 60% of vinyl chloride molecules as building blocks, for example a vinyl chloride copolymer with one or more comonomers, such as a vinyl ester of a monocarboxylic acid of 2 to 9 carbon atoms, or an ester of an aliphatic alcohol of 1 to 9 carbon atoms and an ethylenically unsaturated carboxylic acid of 3 to 5 carbon atoms, eg. the esters of acrylic acid, methacrylic acid or maleic acid, or a copolymer of vinyl chloride with one or more of these carboxylic acids themselves as comonomers, or hydroxyl-containing vinyl chloride copolymers, which can be prepared by partial hydrolysis of vinyl chloride/vinyl ester copolymers or direct copolymerization of vinyl chloride with hydroxyl-containing monomers, such as allyl alcohols or 4-hydroxybutyl or 2-hydroxyethyl(meth)acrylate. Other suitable binders are mixtures of one or more polyurethane elastomers with polyvinyl formals, phenoxy resins and PVC copolymers of the composition stated above. Preferred binders are polyvinyl formal binders, and polyurethane elastomer mixtures of the stated type, especially mixtures with polyvinyl formals. Preferably used polyurethane elastomer binders are commercial elastomeric polyesterurethanes obtained from adipic acid, butane-1,4-diol and 4,4'-diisocyanatodiphenylmethane.

Other advantageous binders are OH-containing polyureaurethane binders which are crosslinked with a polyisocyanate, the OH-containing polyureaurethane being obtained by reacting a polydiol, a diol and a primary or secondary amino alcohol and, if appropriate, a triol with a diisocyanate.

Magnetic dispersions which are particularly useful for the preparation of rigid magnetic disks preferably contain binders such as epoxy resins, phenoxy resins, aminoplast precondensates, polyester resins, polyurethanes or polyurethane formers or mixtures of such binders with one another or with other binders, such as polycarbonates or vinyl polymers, eg. vinyl chloride copolymers or vinylidene chloride copolymers, or heat-curable acrylate or methacrylate copolymers.

Aqueous dispersions of organic polymers may also be used as binders, polyurethane ionomers, as described in, for example German Laid-Open Applications No. DOS 2,920,334 and No. DOS 3,005,009, being particularly suitable for this purpose.

Further additives for the preparation of magnetic layers, for example small amounts of monocarboxylic acids, or mixtures or esters of these, fillers, such as carbon black, graphite, powdered quartz and/or non-magnetizable powders based on silicates, and leveling agents, such as small amounts of silicone oil, may be added to the dispersions. Advantageously, the total amount of these additives should not exceed 12, preferably 8, percent by weight, based on the dry weight of the magnetic layer.

The magnetic layers are prepared in a conventional manner. To do this, the magnetic material, together with the binder used and a sufficient amount of solvent, is dispersed in a dispersing apparatus, eg. a tubular ball mill or a stirred ball mill, with the addition of the copolymer and, where relevant, the other additives. To obtain an advantageous binder/pigment ratio, these may be added to the mixture either in the solid state or in the form of from 20 to 60% strength solutions or from 30 to 60% strength dispersions. It has proven advantageous to continue dispersing until an extremely fine dispersion of the magnetic material has been achieved; this may take from 1 to 3 days. A completely homogeneous magnetic dispersion is then obtained by repeated filtration.

The magnetic dispersion is then applied onto the non-magnetizable base with the aid of a conventional coating apparatus, eg. a knife coater. Suitable non-magnetic and non-magnetizable bases are the conventional bases, in particular films of linear polyester, such as polyethylene terephthalate, in general from 4 to 200 μm, in particular from 6 to 36 μm, thick. Before the still liquid coating mixture is dried on the base, which is advantageously effected at from 50° to 90° C. in the course of from 2 to 5 minutes, anisotropic magnetic particles are oriented along the intended recording direction by the action of a magnetic field. The magnetic layers can then be calendered and compressed on conventional apparatuses by being passed between heated and polished rollers, if necessary at from 50° to 100° C., preferably from 60° to 80° C. The magnetic layer is in general from 1 to 20 μm, preferably from 2 to 10 μm, thick.

Compared with the prior art magnetic recording media, the novel ones possess particularly good frictional properties in the form of tapes, exhibit extremely low abrasion during operation, both under standard conditions of temperature and humidity and under conditions of high temperature and high humidity, and show little tendency to corrosion in the case of zinc and aluminum. Moreover, the novel magnetic recording media have a smooth surface, favorable magnetic properties and advantageous overall electroacoustic characteristics.

The Examples which follow illustrate the invention and compare it with prior art experiments. In the Examples and Comparative Experiments, parts and percentages are by weight, unless stated otherwise.

EXAMPLE 1

In a steel ball mill having a capacity of 6000 parts by volume and containing 8000 parts of balls, 96 parts of a 25% strength aqueous solution of a copolymer based on methylpolyglycol acrylate/methacrylic acid, 12 parts of a commercial silicone oil and 3.6 parts of triethanolamine dioleate were added to 1200 parts of an anisotropic magnetic iron oxide having a coercive force of 26 kA/m and a specific surface area of 20 m²/g, and the mixture was dispersed with 840 parts of water for 24 hours. Thereafter, 750 parts of a 40% strength polyurethane ionomer dispersion based on a hydroxyl-containing polyester, 4,4'-diphenylmethane diisocyanate, butane-1,4-diol, Epikote diacrylate, mercaptoacetic acid and triethylamine were incorporated into this mixture. The resulting dispersion was filtered and then applied as a layer, with the aid of a knife coater, onto a 12 μm thick polyethylene terephthalate film. The coated film was passed through a homogeneous magnetic field to orient the magnetic particles in the layer, after which it was dried at from 70° to 90° C. and the layer was then calendered and compressed at 70° C. The dry layer was 4.7 μm thick. The film coated in this manner was slit into 3.81 mm wide tapes, and commercial cassettes were equipped with these.

The electroacoustic properties correspond to the IEC I standard. The results of the mechanical measurements obtained in the tests described below are shown in Table 1.

Test 1

Coefficient of friction (layer/steel, before/after continuous operation)

The coefficients of friction are determined in accordance with DIN 45,522, sheet 1, on the unused tape and on the tape which has been subjected to continuous use.

Test 2

Quasistatic friction

The coefficient of friction is determined by measuring the tensile force which is produced as a result of friction generated by a magnetic tape passing over a fixed graduated drum. The latter is a steel drum having a surface roughness of about 0.15 μm and a diameter of 70 mm. The piece of tape is 25 cm long and is fed over the drum under a tape tension of 20 cN at a rate of 1 mm/sec and at an angle of wrap of 180°. The tension at the load cell, F, is a measure of the coefficient of friction μ, the relevant expression being $\mu=(1/\text{II}).\ln/(F/20)$ (test conditions: 23° C., 50% relative humidity).

Test 3

Dynamic friction

The coefficient of friction is measured using a procedure similar to that for Test 2, except that the magnetic tape is passed over a graduated drum rotating at a peripheral speed of 9.5 cm/sec.

Test 4

Abrasion during continuous operation

This measurement is used to assess the abrasion properties of a tape. The abrasion is measured in the form of the weight loss of a tape loop, in mg. The length of the loop is 95 cm, the tape speed 4 m/sec, the tape tension 35 cN and the running time 1 hour, the test being carried out at an ambient temperature of 23° C. and a relative humidity of 50%.

Test 5

Deposition test 4 cassettes each containing the magnetic tape are played back on a recorder for 20 hours at 30° C. and 93% relative humidity. Thereafter, the deposits on the erasing head, on the sound head and on the capstan are assessed visually. The thickness of the deposits is recorded on the basis of a scale (from 1=no deposit to 6=very thick deposit), and the average is taken.

Test 6

Corrosion test Zn/Al

As a result of friction with the parts in contact with the tape, the magnetic tape causes more or less abrasion in the recorder, depending on the formulation, and some or all of the materials from this abrasion remain deposited on these parts. The deposits present and the magnetic tape itself can corrode the metallic sound heads, corrosion being promoted by conditions of high temperature and high humidity.

To measure the corrosion characteristics, a commercial cassette containing the magnetic tape to be tested is played back for 20 hours at 30° C. and a relative humidity of 93% on a recorder equipped with a dummy sound head of zinc or aluminum.

The deposits on the dummy sound head are assessed visually, and corrosion and abrasion are evaluated separately, the scale used extending from 1 to 6. The values are the assessments of corrosion and abrasion for an apparatus and the associated dummy head.

EXAMPLE 2

The procedure described in Example 1 was followed, except that the triethanolamine dioleate was not added prior to dispersing but mixed in thoroughly for 30 minutes with a high-speed stirrer after the dispersion had been prepared. The test results are shown in Table 1.

COMPARATIVE EXPERIMENT 1

The procedure described in Example 1 was followed, except that, instead of the triethanolamine dioleate, the same amount of methyl stearate was added. The test results are shown in Table 1.

COMPARATIVE EXPERIMENT 2

The procedure described in Example 1 was followed, except that, instead of the triethanolamine dioleate, the same amount of n-butyl stearate was added. The test results are shown in Table 1.

COMPARATIVE EXPERIMENT 3

The procedure described in Example 1 was followed, except that, instead of the 3.6 parts of triethanolamine dioleate, a mixture of 32.4 parts of methyl oleate, 16.0 parts of triethanol dioleate and 25.6 parts of tetrapropylenebenzenesulfonic acid was employed, as described in Example 1.3 of German Published Application No. DAS 2,250,382.

This lubricant mixture could be incorporated into an aqueous medium only with great difficulty and migrated rapidly to the surface of the layer, with the result that the heads became smeared during operation of the tape. It was therefore impossible to check the tape properties.

TABLE 1

|  | Examples | | Comparative Experiments | |
|---|---|---|---|---|
|  | 1 | 2 | 1 | 2 |
| Test 1 (before continuous operation) | 0.32 | 0.30 | 0.48 | 0.52 |
| Test 1 (after continuous operation) | 0.32 | 0.29 | 0.62 | 0.64 |
| Test 2 | 0.18 | 0.20 | 0.30 | 0.33 |
| Test 3 | 0.28 | 0.28 | 0.50 | 0.51 |
| Test 4 | 0.1 | 0.1 | 4.2 | 3.8 |

TABLE 1-continued

|  | Examples | | Comparative Experiments | |
|---|---|---|---|---|
|  | 1 | 2 | 1 | 2 |
| Test 5 | 1.3 | 1.3 | 2.8 | 2.7 |
| Test 6a (Zn) | 1/1 | 1/1.5 | 2/4 | 2/5 |
| Test 6b (Al) | 1/1 | 1/1.5 | 2/4.5 | 2/5 |

EXAMPLE 3

900 parts of γ-iron oxide having a coercive force of 28.0 kA/m and a specific surface area of 18 m$^2$/g, 43 parts of a 50% strength solution of a methylpolyglycol acrylate/methacrylic acid copolymer in tetrahydrofuran, 800 parts of a solvent mixture consisting of equal amounts of tetrahydrofuran and dioxane and 390 parts of a 20% strength solution of an 80:10:10 copolymer of vinyl chloride, dimethyl maleate and diethyl maleate, having a K value of 60, in the abovementioned solvent mixture were introduced into a steel ball mill having a capacity of 6000 parts by volume and containing 8000 parts of steel balls of 4-6 mm diameter, and the mixture was dispersed for 40 hours. Thereafter, 852 parts of a 13% strength solution of a polyesterpolyurethane which had a K value of 60 and was prepared from a polyester of butanediol and adipic acid (0.42 mole), butanediol (0.55 mole), trimethylolpropane (0.03 mole) and diphenylmethane diisocyanate (1.05 mole), in a mixture of equal amounts of tetrahydrofuran and dioxane, 0.9 part of hydroquinone and 4.5 parts of triethanolamine dioleate were added, after which the mixture was dispersed for a further 3 hours. The resulting dispersion was filtered under pressure through a filter having 5 μm pores and was applied onto a 12 μm thick polyethylene terephthalate film by means of a conventional knife coater. The coated film was passed through a magnetic field to orient the magnetic particles and was then dried at from 50° to 90° C.

After drying, the magnetic layer was compressed and calendered by being passed, under a nip pressure of 200 kp/cm, between rollers heated at 70° C., so that the thickness of the magnetic layer was 4.5 μm. The film was then slit into 3.81 mm wide tapes for audio use. The electroacoustic properties were tested in accordance with DIN 45,401, DIN 45,403 and DIN 45,812, sheet 12, against reference tape IEC I, and were found to correspond to the standard.

The results of the mechanical measurements are shown in Table 2.

EXAMPLE 4

The procedure described in Example 3 was followed, except that 10.17 parts of triethanolamine dioleate were added. The test results are shown in Table 2.

COMPARATIVE EXPERIMENT 4

The procedure described in Example 3 was followed, except that, instead of the triethanolamine dioleate, a mixture of 24.3 parts of methyl oleate, 10.17 parts of triethanolamine dioleate and 18.17 parts of dodecylbenzenesulfonic acid was added, as described in German Published Application No. DAS 2,250,382. The test results are shown in Table 2.

COMPARATIVE EXPERIMENT 5

The procedure described in Example 3 was followed, except that, instead of the triethanolamine dioleate, a mixture of 36.63 parts of tetrahydrofuryl oleate, 10.17 parts of triethanolamine dioleate and 6.03 parts of p-toluenesulfonic acid was added, as described in German Published Application No. DAS 2,250,382. The test results are shown in Table 2.

COMPARATIVE EXPERIMENT 6

The procedure described in Example 3 was followed, except that, instead of the triethanolamine dioleate, a mixture of 2.7 parts of n-butyl stearate and 4.5 parts of isostearic acid was added. The test results are shown in Table 2.

COMPARATIVE EXPERIMENT 7

The procedure described in Example 3 was followed, except that, instead of the triethanolamine dioleate, 4.5 parts of n-butyl stearate were added. The test results are shown in Table 2.

COMPARATIVE EXPERIMENT 8

The procedure described in Example 3 was followed, except that, instead of the triethanolamine dioleate, a mixture of 1.8 parts of n-butyl stearate, 9 parts of isostearic acid and 0.9 part of silicone oil was added. The test results are shown in Table 2.

TABLE 2

|  | Example | | Comparative Experiment | | | | |
|---|---|---|---|---|---|---|---|
| Test | 3 | 4 | 4 | 5 | 6 | 7 | 8 |
| 1 (bef. cont. operation) | 0.31 | 0.30 | 0.40 | 0.40 | 0.46 | 0.48 | 0.40 |
| 2 | 0.22 | 0.25 | 0.44 | 0.26 | 0.30 | 0.30 | 0.25 |
| 3 | 0.31 | 0.34 | 0.55 | 0.36 | 0.38 | 0.35 | 0.36 |
| 5 | 2.0 | 2.3 | 3.8 | 2.5 | 5.0 | 5.0 | 3.5 |
| 6a (Zn) | 1.5/2 | 1/1 | 2/3.5 | 2/3 | 2/4.5 | 1.5/4.5 | 1.5/3.5 |
| 6b (Al) | 1.5/2 | 1/1 | 2/3 | 1.5/3 | 2/5 | 1.5/5 | 1.5/3.5 |

Comparative Experiments 4 and 5, which were carried out on the basis of German Published Application No. 2,250,382, using triethanolamine dioleate in combination with dodecylbenzenesulfonic acid or p-toluenesulfonic acid, show that the resulting magnetic recording media possess substantially poorer properties than the magnetic recording media according to the invention.

The conventional lubricants, such as n-butyl stearate and isostearic acid, which were used in Comparative Experiments 6 and 7 lead to substantially poorer, and in some cases unsatisfactory, coefficients of friction, abrasion characteristics, tape surface, magnetic properties and electroacoustic data. Although the tape properties are improved by combining a plurality of lubricants, as in Comparative Experiment 8, the good results of Examples 3 and 4 are still not obtained.

We claim:
1. A magnetic recording medium which comprises:
   (a) a non-magnetic base;
   (b) at least one magnetizable layer bonded to the base, said layer containing
     (b$_1$) a polymeric binder,
     (b$_2$) magnetic material finely dispersed in said binder,
     (b$_3$) from 0.1 to 2.0% by weight, based on the weight of the magnetic material of triethanolamine dioleate as the sole lubricant, and
     (b$_4$) a polymer of polyether-acrylate and (meth)acrylic acid as a dispersant.
2. The magnetic recording medium of claim 1, wherein the amount of lubricant is from 0.1 to 0.6% by weight based on the weight of the magnetic material.

* * * * *